United States Patent

Vold

[15] 3,662,608
[45] May 16, 1972

[54] TWO DEGREES OF FREEDOM BALL BEARING SUSPENSION FOR A ROTOR OF A GYROSCOPE

[72] Inventor: Gunnar Johan Vold, Mahwah, N.J.
[73] Assignee: The Bendix Corporation
[22] Filed: Sept. 30, 1968
[21] Appl. No.: 763,867

[52] U.S. Cl. ..................................................74/5
[51] Int. Cl. ..........................................G01c 19/16
[58] Field of Search ......................74/5, 5.41, 5.34, 5.7

[56] References Cited

UNITED STATES PATENTS

| | | | |
|---|---|---|---|
| 2,852,943 | 9/1958 | Sedgfield | 74/5.7 |
| 2,913,907 | 11/1959 | Sedgfield | 74/5.41 |
| 2,948,157 | 8/1960 | Sedgfield | 74/5.34 |
| 2,995,938 | 8/1961 | Brodersen et al. | 74/5.7 |
| 3,365,960 | 1/1968 | Siff et al. | 74/5 X |

*Primary Examiner*—Robert F. Stahl
*Attorney*—Plante, Hartz, Smith and Thompson

[57] ABSTRACT

A two degrees of freedom ball bearing suspension for a rotor of a gyroscope to compensate for coercive torques through the provision of a torque wire connected between a drive element of a motor and the rotor of the gyroscope, the drive element of the motor being rotatably carried by internal roller bearings mounted in a stator element of the motor and the rotor of the gyroscope being rotatably mounted on a universal ball bearing joint supported by the stator element of the motor, the rotor of the gyroscope being axially biased toward the universal ball bearing joint under tension applied through the torque wire by a disc type belleville spring positioned between an end of the internal roller bearings and an internal surface of the stator element so that the coercive torques may be minimized by a negative spring action effected by the torque wire due to the tension therein so that the total elastic restraint of the ball bearing suspension may be brought extremely close to zero.

10 Claims, 1 Drawing Figure

PATENTED MAY 16 1972
3,662,608
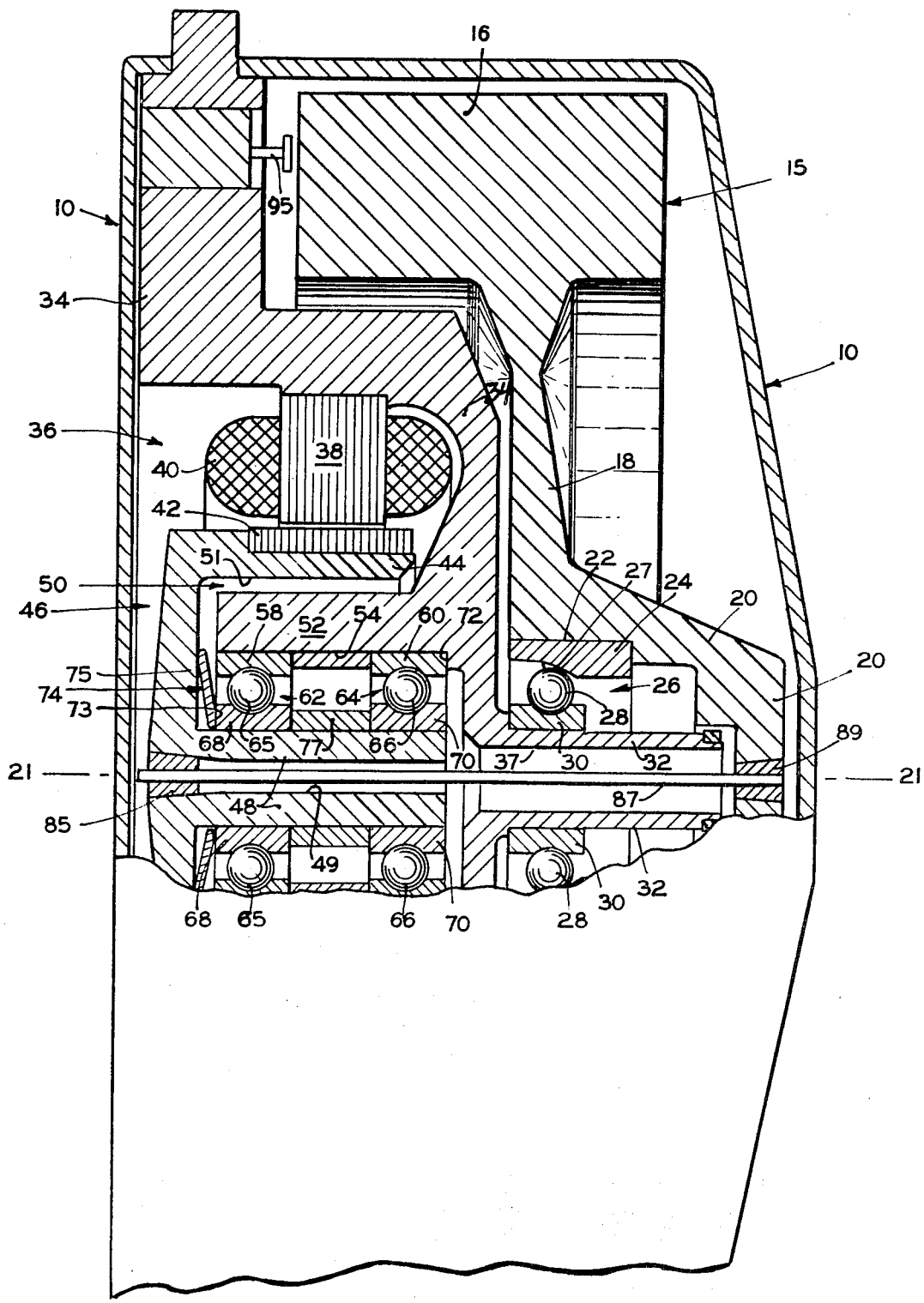
INVENTOR.
GUNNAR J. VOLD
BY Herbert L. Davis
ATTORNEY

TWO DEGREES OF FREEDOM BALL BEARING SUSPENSION FOR A ROTOR OF A GYROSCOPE

BACKGROUND OF THE INVENTION

1. Field of the Invention

This invention relates to the field of gyroscopes and, more particularly, to a means of suspending the rotor of the gyroscope so as to reduce the error torques therein.

2. Prior Art of the Invention

Heretofore, highly accurate single degree of freedom gyroscopes have been conventionally suspended in two ball bearing gimbals, but such arrangements have been found to suffer from error torques due to gimbal friction and gimbal compliance. In an effort to avoid these disadvantages, a number of ball and socket type freedom gyroscopes have been heretofore developed, but these generally have been found to suffer from either high coercive torques between stator field and rotor, or from low shock capacity, or both.

In the present invention, there is provided a specific structural arrangement in which these torques may be minimized by the negative spring action of a torque wire which suspends the rotor of the gyroscope under tension on a universal ball bearing joint so that the coercive torques may be minimized by the negative spring action affected by the torque wire due to the tension therein and thereby the total elastic restraint of the ball bearing suspension may be brought extremely close to zero.

In the prior art, there have been noted, as of interest, a U.S. Pat. No. 3,074,283, granted Jan. 22, 1963 to Thomas R. Quermann, and which is directed to a single degree of freedom rate gyroscope, as well as U.S. Pat. Nos. 3,176,523, granted Apr. 6, 1965 to Thomas S. Amlie et al.; 3,323,375, granted June 6, 1967 to Carl H. Hevert et al., and 3,327,538, granted June 27, 1967 to Walter J. Krupick et al., and which are directed to a two-axis rate gyroscope with flexible shaft supports. The U.S. Pat. No. 3,323,375 discloses in FIG. 7 thereof a belleville spring for bearing compensation.

Moreover, U.S. Pat. No. 3,214,980, granted Nov. 2, 1965 to W. R. Simons, has been noted as of interest in showing a fluid filled casing while U. S. Pat. No. Re.26,370, granted Apr. 9, 1968 to Harry N. Eklund, discloses a hydrogen gas filled casing to reduce frictional stray torques.

The aforenoted prior art references fail to suggest, however, the specific structural arrangement of the torque wire interconnecting the drive element of the motor and the rotor of the gyroscope suspended on a universal joint ball bearing so as to reduce the error torques, as in the present invention.

SUMMARY OF THE INVENTION

The present invention relates to an idea of means for bridging the gap between gimballed free gyroscopes and floated gyroscopes by a ball bearing suspension means embodying a torque wire biased under tension of a belleville spring so as to compensate for coercive torques and minimize error torques by a negative spring action effected by the torque wire due to the tension in the wire.

An object of the invention is to provide a ball bearing suspension means for a rotor of a gyroscope so as to provide a free gyroscope that is compensated for coercive torques, and is substantially free of gimbal friction.

Another object of the invention is to provide a ball bearing suspension means for the driven rotor of a gyroscope having an inertial reference rim which will tend to maintain its spin direction in space, subject only to error torques which the structural arrangement of the ball bearing suspension means will tend to minimize.

Another object of the invention resides in a recognition and solution of the problems presented in that in such a gyroscope there is a coercive torque in the universal joint bearing of the rotor of the gyroscope tending to align the inertial reference rim of the gyroscope rotor to the frame and a similar coercive torque in the torque wire herein provided for driving the rotor of the gyroscope and acting in a sense to overcome primarily the bending of the wire itself while in addition the torque wire acts in a sense tending to coerce the inertial reference rim of the rotor through a "universal joint action" on the bearing with a torque that is proportional to the misalignment angle and proportional to the driving torque, and which error torques may be minimized in the present invention through the arrangement of the several parts of the universal joint ball bearing suspension means and the provision of the torque wire drivingly connecting a drive element of a motor with the rotor of the gyroscope, together with a spring means biasing the rotor of the gyroscope through the torque wire toward the universal joint ball bearing suspension means supporting the rotor so as to minimize the coercive torques by the negative spring action applied through the torque wire due to the tension in the wire to cause the total elastic restraint of the universal joint ball bearing suspension of the rotor of the gyroscope to be brought extremely close to zero, while the coercive friction torques may be effectively removed and replaced by this low value of elastic restraint.

Another object of the invention is to provide a universal joint ball bearing suspension for the rotor of a gyroscope including a torque wire drivingly connected to the rotor, spring means biasing the torque wire and thereby the rotor of the gyroscope into cooperative relation with the universal joint ball bearing suspension in an arrangement in which the coercive friction torques may be removed and replaced by a low value of elastic restraint in the universal joint ball bearing suspension.

These and other objects and features of the invention are pointed out in the following description in terms of the embodiment thereof which is shown in the accompanying drawing.

DESCRIPTION OF THE DRAWING

The drawing is a horizontal fragmentary sectional view of a gyroscope embodying the invention and showing a motor, ball bearing suspension means for a drive element of the motor, a rotor of the gyroscope, universal joint ball bearing suspension means for the rotor of the gyroscope, together with a torque wire biased under tension of a disc type belleville spring mounted within the drive element of the motor for drivingly connecting the drive element and the rotor of the gyroscope.

DESCRIPTION OF THE INVENTION

Referring to the drawing, the motor, ball bearing suspension means and rotor of the device of the present invention is enclosed in a hollow housing 10 for operation as a free gyroscope which may be mounted on an inertial platform and which platform may in turn be servoed in a conventional manner about three axes, two of which axes will be controlled by a sensor device 95 in response to the relative angular position of a rotor 15 of the gyroscope or the gyroscope may be mounted in a two-axes gimbal system with both gimbals being servoed in a conventional manner in response to the controlling action of the sensor device 95.

The rotor 15 of the gyroscopic device is mounted within the hollow housing 10 and is essentially a homogenous mass having a heavy outer inertial rim portion 16 connected by a web 18 with a hollow rotor shaft 20 extending coaxial with a spin axis 21—21 of the rotor 15. An inner surface portion 22 of the rotor shaft 20 receives an outer race 24 of a universal ball bearing joint 26. The outer race 24 has an inner arcuate surface 27 for receiving bearing balls one of which is indicated by the numeral 28 and carried by an inner race 30. The bearing balls 28 are arranged in cooperative relation between the outer and inner races 24 and 30.

The inner race 30 of the universal ball bearing joint 26 is mounted on a hollow shaft portion 32 projecting axially from an inner surface of a stator portion 34 of an electric motor 36 which may for example be of a conventional hysteresis type. The stator portion 34 of the motor 36, as shown in the drawing, is affixed to the casing 10 while the hollow shaft portion 32 projecting from the stator portion 34 has formed therein a longitudinal bore 37.

The stator portion 34 of the hysteresis motor 36 carries therein conventional stator laminations 38 of the motor with windings 40 arranged in cooperative relation with a conventional hysteresis ring 42 of the motor 36. The hysteresis ring 42 is carried by an outer annular flange portion 44 projecting axially from a rotor or drive element 46 of the motor 36 having an inner tubular portion 48 projecting axially from the drive element 46 into the annular flange portion 44. The tubular portion 48 has a bore 49 formed therein, while between the annular flange portion 44 and the tubular portion 48 is an annular recess 51 into which projects from the stator portion 34 of the motor 36 an annular flange portion 52. The inwardly projecting annular flange portion 52 is hollow so as to provide a bore 54 coaxial with the axis 21—21 and the annular flange portion 44 and inner tubular portion 48 of the motor drive element 46.

The bore 54 of the hollow annular flange portion 52 is arranged to receive therein outer races 58 and 60 of angular contact type bearings 62 and 64 respectively. Bearing balls 65 of the bearing 62 are arranged in cooperative relation between the outer bearing race 58 and an inner bearing race 68. The inner bearing race 68 is held in a fixed position within the bore 54 and adjacent an inner annular surface of the tubular portion 48.

Further bearing balls 66 of the bearing 64 are arranged in cooperative relation between the outer bearing race 60 and an inner bearing race 70. The inner bearing race 70 is held in a fixed position within the bore 54 and adjacent an inner annular surface of the tubular portion 48.

The outer bearing race 60 of the bearing 64 is held by an undercut portion 72 bearing at the inner side surface thereof while an outer side surface of the inner bearing race 68 of the bearing 62 has bearing thereon an inner annular portion 73 of a belleville type disc spring 74. An outer annular surface 75 of the belleville spring 74 bears upon an inner surface of the drive element 46 of the motor 36 while an annular spacer 77 is operatively positioned between the bearings 62 and 64.

Mounted in the bore 49 of the tubular portion 48 of the drive element 46 coaxial with axis 21—21 and at the outer end of the motor drive element 46 is a securing member 85 in which is fastened one end of a flexible steel torque wire 87 which extends longitudinally through the bore 37 provided in the hollow shaft portion 32 projecting axially from the stator portion 34 of the motor 36. The torque wire 87 is secured at the opposite end in a securing member 89 mounted in an end wall of the rotor 15 concentric with the spin axis 21—21 thereof.

Electrical pickoffs of a conventional type, one of which is indicated by the numeral 95, project from the stator portion 34 of the motor 36 and are arranged in cooperative relation with the outer inertial rim portion 16 of the rotor 15 to sense misalignment of the reference rim 16 in relation to the frame or casing 10 about two orthogonal axes.

OPERATION

With reference to the drawing, it can be seen that the device embodying the present invention has two rotative members, namely the drive rotor 46 of the motor 36 and a driven rotor 15 having the inertial reference rim 16. Connecting the two is the torque wire 87 which is in tension, permanently preloading the universal joint bearing 26 which provides a more or less self-aligning bearing means. The tension in the torque wire 87 and the preload on the universal joint bearing 26 is maintained by the belleville washer type spring 74. A stationary frame or casing 10 further contains the motor stator 34 and the electrical pickoffs 95 of conventional type located on the stator member 34 in cooperative relation with the inertial reference rim 16 so as to detect misalignment between the frame 10 and the inertial reference rim 16 about two orthogonal axes.

In operation, the inertial reference rim 16 will tend to maintain its spin direction in space, subject to only error torques which the operative arrangement of the present invention is designed to minimize. In this connection, the major error torque of the subject device is the coercive torque in the universal joint bearing 26 which acts in a sense to align the rim 16 in relation to the casing or frame 10, while a similar coercive torque acts in the torque wire 87 in a sense tending to overcome primarily the bending of the wire 87. In addition the torque wire 87 will tend to coerce the rim 16 through a universal joint action at the bearing 26 with a torque that is proportional to the misalignment angle of the inertial reference rim 16 relative to the casing 10 and proportional to the driving torque applied through the wire 87.

In the present invention, the arrangement is such that these aforementioned error torques may all be minimized by a negative spring action at torque wire 87 due to the tension in the wire 87 applied by the disc type belleville spring 74. The total elastic restraint of the present device may be thereby brought extremely close to zero.

In the aforenoted arrangement, it should be noted, however, that it is not of extreme importance that the elastic restraint of the suspension be brought entirely to zero. Instead, it is of considerably greater consequence that the coercion friction torques have been removed and replaced by a low value of elastic restraint as in the present invention. With a high resolution pickoff and a tight servo, it will be possible with the present invention to hold the drift of the gyroscope to a very low value.

In the present invention, the device, as described with reference to the drawing, is intended for operation as a free gyroscope which may be mounted on an inertial platform and servoed about three axes in a conventional manner, two of which axes will be controlled by the sensors 95 or the present gyroscopic device may be mounted on a two-axis gimbal system, both gimbals being servoed in response to control signals provided by the sensor 95 in a conventional manner.

Although only one embodiment of the invention has been illustrated and described, various changes in the form and relative arrangement of the parts, which will now appear to those skilled in the art, may be made without departing from the scope of the invention. Reference is, therefore, to be had to the appended claims for a definition of the limits of the invention.

What is claimed is:

1. In a gyroscope, the combination comprising a casing, a motor including a stator element affixed to an inner surface of the casing, a drive element including a first hollow shaft, and ball bearings for rotatably mounting the first hollow shaft in the stator element and thereby the drive element within the stator element in cooperative relation therewith, a second hollow shaft projecting from the stator element in longitudinal alignment with the first hollow shaft, a driven rotor having an inertial reference rim, a universal roller bearing joint means mounting the rotor on the second hollow shaft for angular movement thereof about two orthogonal axes, a torque wire extending longitudinally in the first and second hollow shafts and drivingly connecting the drive element of the motor to the rotor, spring means applying tension to the torque wire in a sense to provide a preload on the universal roller bearing joint means, the rotor being driven through the torque wire by the drive element of the motor so as to cause the inertial reference rim of the rotor to tend to maintain its spin direction in space, the universal roller bearing joint means applying a coercive torque tending to align the inertial rim of the rotor to the casing and a coercive torque to the torque wire acting in opposition to a bending of the wire, and the torque wire applying a coercive torque to the inertial rim of the rotor through the universal roller bearing joint means that is proportional to a misalignment angle of the inertial reference rim to the casing and proportional to the driving torque so that error torques may be minimized by a negative spring action of the torque wire due to the tension in the torque wire applied by the spring means.

2. The combination defined by claim 1 in which the spring means includes a disc type spring mounted within the drive element of the motor to axially bias the drive element of the motor relative to the stator element and the torque wire in a sense to apply a tension to the torque wire to provide the preload on the universal roller bearing joint means.

3. The combination defined by claim 2 in which the universal roller bearing joint means includes inner and outer bearing races and bearing balls mounted between the bearing races, the outer bearing race having an inner arcuate surface and the bearing balls being arranged in cooperative relation with the inner arcuate surface of the outer bearing race so as to permit angular movement of the rotor about the two orthogonal axes.

4. In combination, motor means including a stator element and a drive element, means for rotatably mounting the drive element in cooperative relation with the stator element of the motor means, a driven rotor element having an inertial reference rim, universal joint means for rotatably mounting the driven rotor element on the stator element for angular movement thereon about two orthogonal axes, means for drivingly connecting the drive element to the driven rotor element including spring means applying tension through the connecting means to the driven rotor element in a sense to effect a preload on the universal joint means, the connecting means applying a coercive torque to the inertial rim of the driven rotor element through the universal joint means proportional to a misalignment angle of the inertial reference rim of the driven rotor element and proportional to a driving torque applied through the connecting means so that error torques may be minimized by a negative spring action of the connecting means due to the tension in the connecting means applied by the spring means.

5. The combination defined by claim 4 in which the spring means includes a spring device separate from the connecting means for axially biasing the drive element relative to the stator element of the motor means in a sense for applying a tension longitudinally through the connecting means to effect the preload on the universal joint means.

6. The combination defined by claim 4 in which the connecting means includes a torque wire secured at opposite ends in concentric relation to the drive element of the motor means and the driven rotor element.

7. The combination defined by claim 4 in which the connecting means includes a torque wire secured at opposite ends in concentric relation to the drive element of the motor means and the driven rotor element, and the spring means includes a disc spring separate from the torque wire for axially biasing the drive element relative to the stator element of the motor means in a sense for applying a tension longitudinally through the torque wire to effect the preload on the universal joint means.

8. The combination defined by claim 4 in which the universal joint means includes roller bearings rotatably mounted between inner and outer bearing races, the outer bearing race having an inner arcuate surface and the bearing balls being arranged in cooperative relation with the inner arcuate surface of the outer bearing race so as to permit angular movement of the driven rotor element about the two orthogonal axes.

9. The combination defined by claim 8 in which the connecting means includes a torque wire secured at opposite ends in concentric relation to the drive element of the motor means and the driven rotor element.

10. The combination defined by claim 8 in which the connecting means includes a torque wire secured at opposite ends in concentric relation to the drive element of the motor means and the driven rotor element, and the spring means includes a disc spring separate from the torque wire for axially biasing the drive element relative to the stator element of the motor means in a sense for applying a tension longitudinally through the torque wire to effect the preload on the universal joint means.

* * * * *